T. R. GIBBS.
ICE CREAM FREEZER.
APPLICATION FILED MAY 23, 1916.
1,240,131. Patented Sept. 11, 1917.
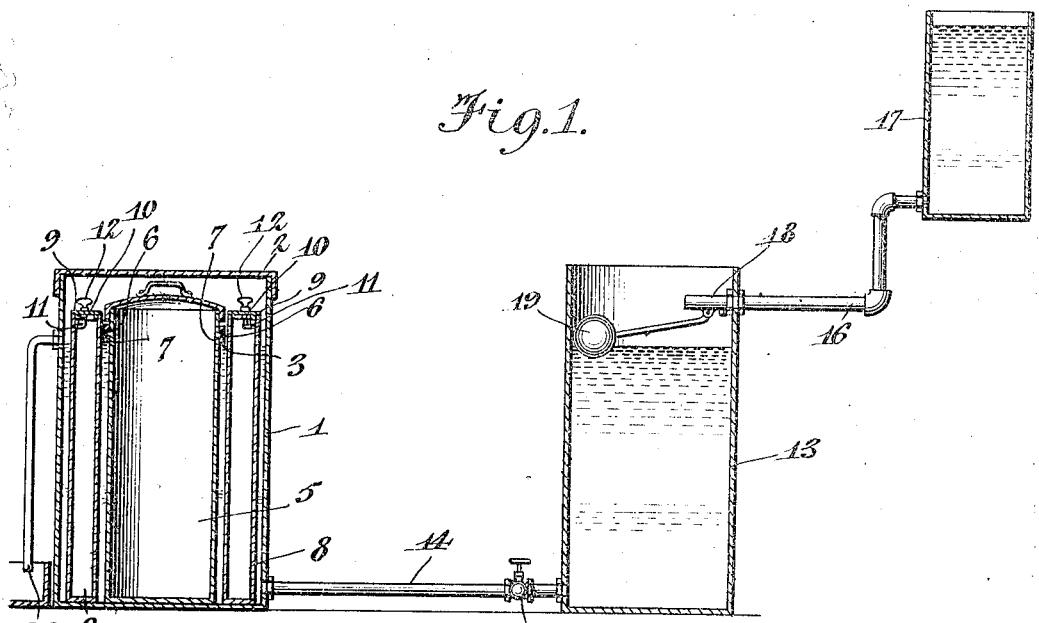
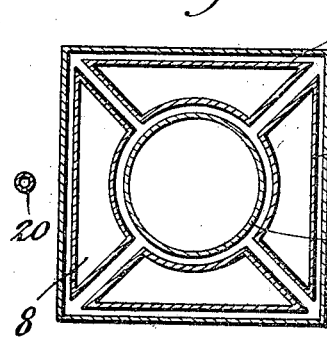
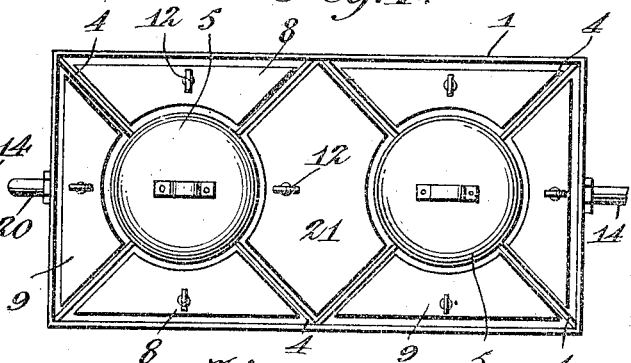
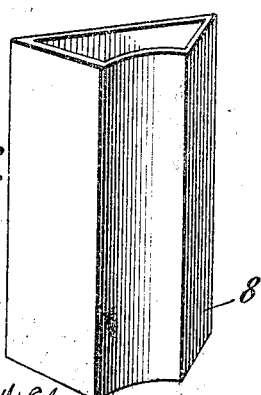
Witnesses
Frederick W. Ely
John J. McCarthy
Inventor
Thomas R. Gibbs.
By Victor J. Evans
Attorney

UNITED STATES PATENT OFFICE.

THOMAS R. GIBBS, OF BELHAVEN, NORTH CAROLINA.

ICE-CREAM FREEZER.

1,240,131.  Specification of Letters Patent.  Patented Sept. 11, 1917.

Application filed May 23, 1916. Serial No. 99,376.

*To all whom it may concern:*

Be it known that I, THOMAS R. GIBBS, a citizen of the United States, residing at Belhaven, in the county of Beaufort and State of North Carolina, have invented new and useful Improvements in Ice-Cream Freezers, of which the following is a specification.

This invention relates to improvements in refrigerating apparatus and has particular application to apparatus for use in the manufacture of ice cream and the like.

In carrying out the present invention, it is my purpose to provide refrigerating apparatus for the manufacture of ice cream and the like wherein the receptacle that contains the material to be congealed will be held in the freezing tank in such manner as to prevent floating of such receptacle when the material is removed therefrom and wherein the material in the receptacle may be maintained in a congealed state by ice containers surrounding the receptacle and submerged in brine.

With the above and other objects in view, the invention consists in the construction, combination and arrangement of parts hereinafter set forth and falling within the scope of the claim.

In the accompanying drawing;

Figure 1 is a diagrammatic sectional view through freezing apparatus constructed in accordance with the present invention.

Fig. 2 is a cross sectional view through the freezing tank.

Fig. 3 is a perspective view of one of the ice containers.

Fig. 4 is a top plan view showing a modified form of ice container.

Fig. 5 is a detail view showing the means for holding the receptacle in the freezing tank.

Referring now to the drawing in detail, 1 designates a freezing tank which is preferably, although not necessarily, rectangular in horizontal section. This tank 1 is provided with a removable cover 2 and arranged centrally of the tank 1 at the upper end thereof is an annular band 3 provided with radial arms 4 terminally connected to the side walls of the freezing tank 1 whereby the band 3 will be held in proper position in the tank 1. 5 designates a receptacle adapted to contain the material to be congealed. This receptacle 5 is designed to be placed in the tank 1 and is formed, adjacent to its upper end, with outwardly projecting diametrically opposed pins 6 engageable in bayonet slots 7 formed in the band 3, the pins and bayonet slots acting to hold the receptacle 5 in proper position in the tank 1. Within the tank 1 around the receptacle 5 are ice containers 8 whose outer walls are parallel with the inner faces of the respective walls of the freezing tank, and whose sides are mitered or beveled to fit one another, and whose inner walls are rounded to conform to the shape of the receptacle 5, as clearly illustrated in Fig. 2 of the drawing. Each ice container 8 is provided with a removable top 9 and journaled in the top 9 is a stem 10 having the inner end formed with a locking lug 11 and the outer end equipped with a handle 12. The lug 11 is adapted to hold the cover in closed position.

13 designates a brine tank arranged alongside of the freezing tank 1, and leading from the lower end of the brine tank 13 to the lower end of the freezing tank is a pipe 14 provided with a hand operated cut off valve 15. Leading into the upper end of the tank 13 is a supply pipe 16 connected with a brine supply tank 17. At the end of the pipe 16 in the tank 13 is a cut off valve 18 connected to a float 19 arranged within the tank 13. The brine flows from the supply tank 17 into the tank 13 and then through the pipe 14 into the freezing tank 1 around the ice containers and the receptacle 5 and as the level of the brine in the tank 13 rises the float 19 is elevated to cut off the valve 18 and as the tanks 13 and 1 are arranged side by side the level of the brine in the freezing tank corresponds to the level of the brine in the tank 13. 20 designates an overflow pipe connected to the freezing tank 1 and leading to a suitable waste receiver.

When it is desired to remove the ice containers 8 from the freezing tank the cut off valve 15 is usually closed to cut off communication between the freezing tank and the tank 13 so that the freezing tank will not be flooded incident to the displacement of the brine when the ice container is replaced in the freezing tank. However, if it should be desired to temporarily withdraw an ice container, as for replenishing the ice therein, it can be done without necessarily cutting off the flow by means of the valve 15, because the brine will not rise rapidly within the freezing tank in the absence of the receptacle. When the latter is reinserted, it will of course raise the level of the brine within the tank 1, but the overflow 20 takes care of the excess of brine so that no salt water runs over into the cream receptacle 5.

When two receptacles 5 are inserted in the freezing tank a central ice container 21, shown in Fig. 4, may be placed between the receptacles and the opposite sides of the container 21 are rounded to conform to the curvature of the receptacles. It will be observed that all ice containers 8 and 21 are so shaped that their inner walls conform with the curvature of the cream receptacle 5, whereas their edges are beveled to conform with the shape of the edges of the next adjacent containers and yet to permit them to be raised from or replaced within the main tank 1. In such removal and reinsertion, each ice container must of necessity pass the radial arms 4, and in order that it may do so freely there is left a certain space between the contiguous beveled edges or sides of the containers, or in other words they are not distinctly in contact with each other. This space, together with that outside and inside the containers, affords room for the brine to flow all around the ice containers and all around the cream receptacle.

I claim:

The herein described ice cream freezing apparatus comprising an upright freezing tank, an upright cream receptacle centrally disposed therein, a band to which the upper end of the receptacle is detachably connected and through which it may be removed, radial arms from the band to the walls of said tank, and a series of ice containers surrounding said receptacle, each having its outer wall paralleling the wall of the tank, its inner wall conforming to the adjacent wall of the receptacle, and its sides beveled to parallel the sides of the contiguous containers and spaced therefrom whereby the containers may be raised past said radial arms.

In testimony whereof I affix my signature.

THOMAS R. GIBBS.